(12) United States Patent
Griech

(10) Patent No.: US 6,845,281 B1
(45) Date of Patent: Jan. 18, 2005

(54) CONTROL AND/OR REGULATING SYSTEM FOR A MACHINE USED FOR PRODUCING A FIBER WEB

(75) Inventor: Wolfgang Griech, Heidenheim (DE)

(73) Assignee: Voith Sulzer Papiermaschinen GmbH, Heidenheim (DE)

( * ) Notice: Subject to any disclaimer, the term of this patent is extended or adjusted under 35 U.S.C. 154(b) by 533 days.

(21) Appl. No.: 09/230,720
(22) PCT Filed: Jun. 19, 1998
(86) PCT No.: PCT/EP98/03760
§ 371 (c)(1), (2), (4) Date: Jan. 29, 1999
(87) PCT Pub. No.: WO99/00547
PCT Pub. Date: Jan. 7, 1999

(30) Foreign Application Priority Data

Jun. 27, 1997 (DE) .......................... 197 27 460

(51) Int. Cl.$^7$ ............................................. G06F 19/00
(52) U.S. Cl. ...................................................... 700/122
(58) Field of Search ................................. 700/121, 122, 700/127–129, 3, 4, 5, 6; 714/10, 11, 13

(56) References Cited

U.S. PATENT DOCUMENTS

| | | | |
|---|---|---|---|
| 5,262,955 A | * 11/1993 | Lewis | ........................ 700/129 |
| 5,381,341 A | 1/1995 | Herrala et al. | ............... 700/129 |
| 5,658,432 A | * 8/1997 | Heaven et al. | ............... 162/198 |
| 5,771,174 A | 6/1998 | Spinner et al. | ............. 700/129 |
| 5,781,440 A | * 7/1998 | Adamy | ........................ 700/122 |
| 5,812,404 A | * 9/1998 | Hamalainen et al. | ........ 700/128 |
| 5,853,543 A | * 12/1998 | Hu et al. | ...................... 162/198 |
| 5,893,055 A | * 4/1999 | Chen | ........................... 702/189 |
| 5,988,846 A | * 11/1999 | Flamm et al. | ................... 700/8 |

FOREIGN PATENT DOCUMENTS

| | | |
|---|---|---|
| DE | 19518306 | 11/1995 |
| DE | 4436405 | 4/1996 |
| DE | 19634996 | 3/1998 |
| DE | 19634997 | 3/1998 |
| EP | 0401188 | 12/1990 |
| EP | 0408894 | 1/1991 |
| WO | 91/05105 | 4/1991 |
| WO | 97/23839 | 7/1997 |

* cited by examiner

*Primary Examiner*—Maria N. Von Buhr
(74) *Attorney, Agent, or Firm*—Greenblum & Bernstein, P.L.C.

(57) ABSTRACT

A control and/or regulating system of a machine for making a fibrous web, such as a paper and/or cardboard web, is provided. The system includes a plurality of actuators, each assigned to at least one final control element, for varying certain properties of the fibrous web to be made. The actuators form intelligent participants in a decentralized communications hardware structure in which they are coupled to one another via a closed pipeline ring and/or a local area network.

27 Claims, 2 Drawing Sheets

CONTROL AND/OR REGULATING SYSTEM FOR A MACHINE USED FOR PRODUCING A FIBER WEB

BACKGROUND OF THE INVENTION

1. Field of the Invention

The present invention relates to a control and/or regulating system of a machine for making a fibrous web, such as a paper and/or cardboard web. In particular, the present invention relates to the control of a machine having a plurality of actuators, each assigned to one final control element, for varying certain properties of the fibrous web to be made.

2. Description of Background Information

A known control and/or regulating system is disclosed in European Patent Disclosure EP-A 0 401 188. The known system has a conventional bus structure with a master and a plurality of slaves for communication between a higher-ranking control unit and the actuators for a cross-direction profile final control element. A characteristic of such a bus structure, which has long been used in many areas of industrial control, is that all the bus participants receive the commands of the master simultaneously. However, but normally only the addressed slave that has the correct address executes the corresponding command and then responds to the master.

A disadvantage of this prior art device is that with the exception of generalized addressing (broadcasting) in which all the slaves are addressed simultaneously, only one action can be performed at any particular time. With such a bus structure, it is impossible from the outset to use a plurality of masters, and thus for example there is no opportunity to use a plurality of control units on the principle of redundancy. An active redundancy concept, for instance with an automatic switchover in the case of a failure, is not a feasible option. Furthermore, the master must always call up the relevant status and alarm reports as well, which is very time-consuming. The number of bus participants is typically limited by bus drivers. A possibly contemplated embodiment with intrinsically desirable fiber-optic hardware would involve major difficulties and considerable expense. Another disadvantage is that hardware address coding is required for the individual participants.

SUMMARY OF THE INVENTION

The present invention provides an improved control and/or regulating system that overcomes the disadvantage of the prior art and which is optimally adaptable to various operating conditions, at a markedly higher data throughput.

According to the invention, this object is attained in that the actuators form intelligent participants in a decentralized communications hardware structure, in which they are coupled to one another via a closed pipeline ring and/or a local area network (LAN).

The control and/or regulating system of the invention is generally suitable for use in the paper industry. Because of the use of a closed pipeline ring, for instance, each participant is always connected only with the participants immediately adjacent to it at a given time. In this closed pipeline ring, the last participant is again connected to the first participant. The distinction between master and slaves are dispensed with. In addition, in the decentralized communications hardware structure of the invention, plurality of data packets can be exchanged at a given time. The maximum number of data packets that can be transmitted on the ring simultaneously is equivalent to the number of participants pipeline ring and twice the number of participants for a biodirectional ring. Compared with earlier control and/or regulating systems, there is thus a considerable overall increase in the data throughput. In principle, the data packets on the ring can be transmitted by each participant at any arbitrary time, such as at the end of the ongoing transfer. Thus the master provided previously and always creating a bottleneck, can be dispensed with. An actuator can also issue a status/alarm report on its own to the ring, for instance, without first having to wait for a prior inquiry from a control unit.

In an expedient practical embodiment, the actuators are intended for cross and/or machine direction profile regulation of certain properties of the fibrous web.

In particular, in addition to the actuators, at least one control unit may also be provided as an intelligent participant of the closed pipeline ring or of the LAN. The actuators and the control unit are preferably equal-ranking participants in the closed pipeline ring or the LAN.

An embodiment of the control and/or regulating system according to the invention includes a decentralized communications hardware structure formed without a master.

The closed pipeline ring may be a unidirectional or a bidirectional ring.

Each data packet transmitted via the closed pipeline ring maybe provided with an identifier, and a given data packet is taken from the ring again at the latest by the participant which transmitted it in the first place. A corresponding data packet thus through the ring at most once.

The size of the data packets transmitted via the closed pipeline ring is variable and preferably can be varied by at least one participant in the closed pipeline ring. The data packets on passing through the ring can be decreased or increased in size, in particular, by the participants. This is especially useful when desired values are sent or actual values are read by a control unit. Each participant can then take the data intended for it from the applicable data packet while it is attaching data arriving from it to the data packet.

The addresses assigned to the intelligent participants of the closed pipeline ring are expediently determined by their respective geometric positions in the pipeline ring.

The address assignment for the intelligent participants of the closed pipeline ring is preferably effected automatically. For instance, it can be effected during or after a given instance of putting the closed pipeline ring into operation.

The use of a so-called "broadcast" address is also possible, which is reserved for data packets that are directed to all the participants in the closed pipeline ring. Such data packets, intended not for individual participants but for all the participants, are sent on, when the ring is free, (i.e., when no further data packet has been transmitted) and sent on to the next participant immediately after an applicable participant has identified the applicable data packet header.

It is especially advantageous if, on the principle of redundancy, at least two control units are provided as intelligent participants in the closed pipeline ring or the LAN. The actions of at least one active control unit can be monitored by at least one redundant control unit. In the event of a defective active control unit, the control unit monitoring it can, issue a corresponding error report, automatically turn off the defective control unit and/or replace it.

Because each participant is connected only to the participants immediately adjacent it, fiber optics can be used in a relatively simple way. For instance, the closed pipeline ring can be constructed on the basis of fiber optics. In principle, it is also possible to construct the ring, at least in part, by way of coaxial cables, twisted pairs, and/or the like.

In an embodiment of the control and/or regulating system according to the invention, the actuators are provided with their own processors.

Preferably, the closed pipeline ring or the LAN forms a multiprocessing system. Each actuator assigned to the closed pipeline ring or to the LAN can preferably operate on the basis of a portion, of a control and/or regulating algorithm.

The decentralized communications hardware structure is formed without a master, and a cross and/or machine direction profile regulation of certain properties of the fibrous web is effected solely by the parallel-operating actuators, which are provided with their own processors and which are coordinated with one another via the closed pipeline ring or the LAN. Each actuator assigned to the closed pipeline ring or the LAN is designed at least for such operations as, in particular, position regulation, a self-test, status ascertainment, communication with the other participants in the closed pipeline ring or the LAN, and/or the like. As already noted, the actuators may, however, be designed additionally or alternatively for more-complex operations. Preferably each actuator assigned to the closed pipeline ring or to the LAN operates on the basis of a portion of a control and/or regulating algorithm. The then-requisite higher data throughput is assured by the closed pipeline ring or the LAN. By comparison, using a conventional master/slave bus structure would involve considerable expense for coordination and communication, which would practically preclude the realization of such a master/slave bus structure.

Expediently, the decentralized communications hardware structure having the closed pipeline ring or the LAN is formed or defined at least in part by standard hardware modules, a standard operating system, and/or standard communications specifications. For instance, standard hardware based on the Intel x86 family (such as 80386EX), a standard operating system for instance based on QNX-Neutrino, and standard communication specifications, for instance ethernet-based and with twisted pairs or FDDI with fiber optics, can be provided.

For an exchange of data from a measuring frame and/or control stations, communications with a quality control system may be necessary. These communications can be done via further processors, which preferably, however, take on no master functions whatever but solely exchange data.

The control and/or regulating system may expediently be designed such that parallel measured values from stationary, parallel-operating sensors can be processed in decentralized fashion.

The local area network is preferably ethernet-based.

The pipeline ring can thus in particular also be replaced alternatively by a preferably ethernet-based so-called local area network (LAN). In such a network, every receiving participant can see the sending participant at all times. Only one participant at one time is possible, but it can be any arbitrary participant. Each participant filters out the data packets intended for it and optionally responds to the sender. One consequence of this concept is that automatic address specification is no longer possible. Instead, this must now be done manually when the system is configured. However, as before, no master is necessary; that is, the system has what is called a peer-to-peer configuration, in which all the participants are of equal rank. The previously indicated redundancy concept can be preserved. Accordingly, if one control unit fails, its function can automatically be taken over by another control unit. In principle, the physical connection of the individual participants and their functions can be as in conjunction with the pipeline ring. Both the concept and the pipeline structure are no longer a classical bus system with a master and many slaves but rather a network system with purely equal-ranking participants.

BRIEF DESCRIPTION OF THE DRAWINGS

The invention will be described in further detail below in terms of exemplary embodiments in conjunction with the drawing, in which.

DETAILED DESCRIPTION OF THE EXEMPLARY EMBODIMENT

Figure 1:
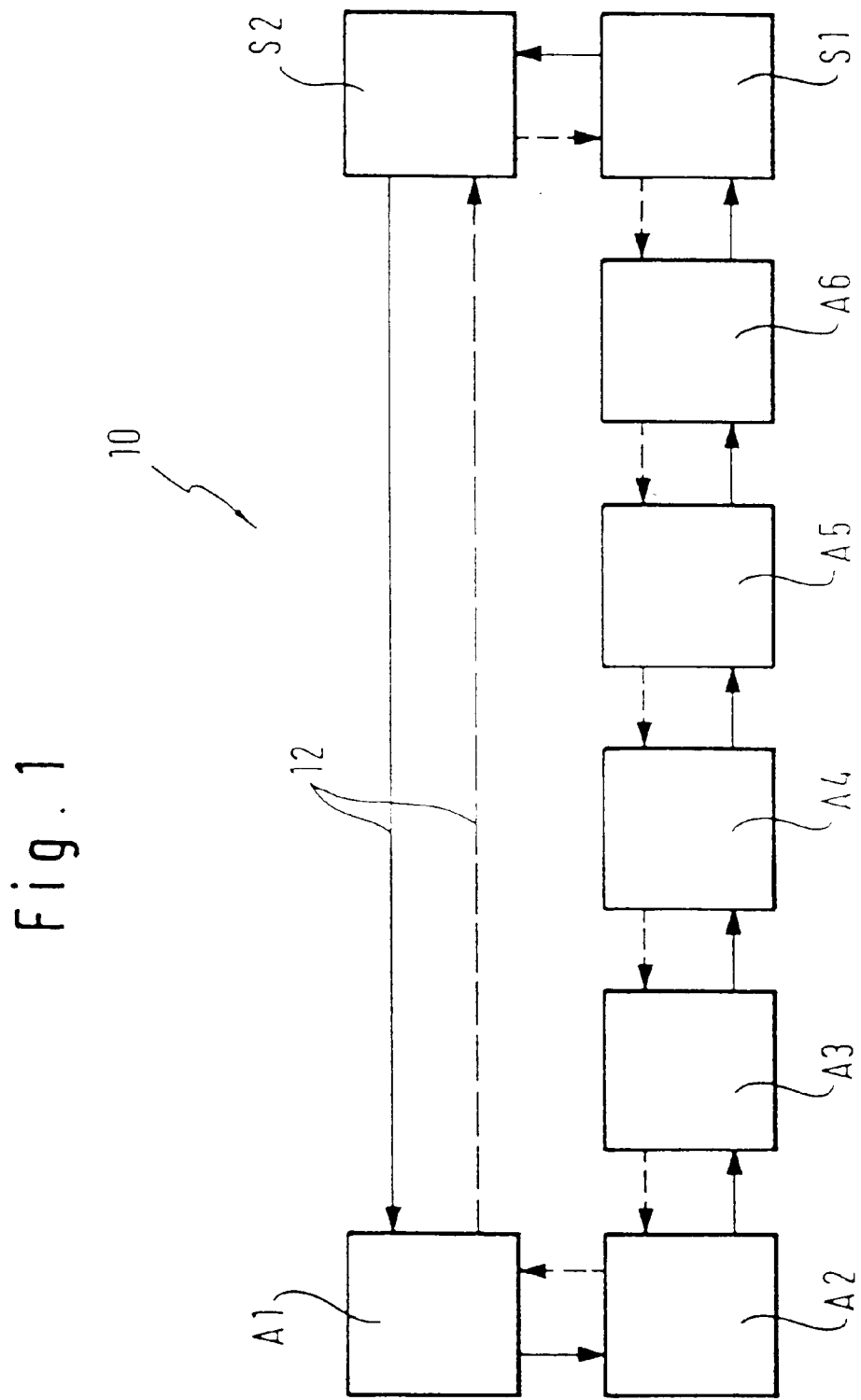
FIG. 1 shows the decentralized communications hardware structure of a first exemplary embodiment of the control and/or regulating system of the invention.

FIG. 1 shows the decentralized communications hardware structure 10, which is part of a control and/or regulating system of a machine for producing a fibrous web, such as a paper and/or cardboard web, with a plurality of actuators. Each actuator is assigned to at least one final control element, for varying certain properties of the fibrous web to be made.

A plurality of actuators A1–A6 and two control units S1 and S2 form intelligent participants in the decentralized communications hardware structure 10, in which they are coupled to one another via a closed pipeline ring 12. Each of the two control units S1 and S2 can include one PC.

In this closed pipeline ring 12, each participant is connected only to the participants immediately adjacent it. The closed pipeline ring., 12 may be a unidirectional or a bidirectional ring, as indicated by the additional path represented in dashed lines.

The actuators A1–A6 and the control units S1, S2 are preferably equal-ranking participants in the closed pipe rings 12. The decentralized communications hardware structure 10 is in particular formed without any master.

Each data packet transmitted over the closed pipeline ring 12 is provided with an identifier. It is removed from the ring again at the latest by the participant which sent it in the first place. The size of data packets transmitted over the closed pipeline ring 12 can be variable, and can be varied by a given participant in the closed pipeline ring 12.

The addresses assigned to the intelligent participants of the closed pipeline ring 12 are determined by their respective geometric position in the pipeline ring 12. The address specification for the intelligent participants is done automatically, for instance, during or after each time the closed pipeline ring 12 is put into operation.

The two control units S1, S2 can be provided on the redundancy principle and designed in such a way that one control unit monitors the actions of the other. If one monitored control unit is defective, then the other control unit can for example issue corresponding error report and/or automatically turn off the defective control unit, and/or take over its operation.

In the present case, the closed pipeline ring 12 is configured to include fiber optics.

Both the actuators A1–A6 and the control units S1, S2 are provided with processors, so that the closed pipeline ring 12 forms a multiprocessing system. Thus, the actuators A1–A6 can then execute not only simple operations (such as a given position regulation, self-test, status determination, and communications with the other participants in the closed pipeline ring 12 and/or the like) but also operate on the basis of a portion, pertaining to the applicable actuator, of a control and/or regulating algorithm.

This decentralized communications hardware structure 10 embodied without a master can be provided for cross and/or machine direction profile regulation of certain properties of the fibrous web. This cross and/or machine direction profile regulation can preferably be effected exclusively by the parallel-operating actuators A1–A6, provided with their own processors, which are coordinated with one another via the closed pipeline ring 12. In the present case, the decentralized communications hardware structure 10 having the closed pipeline ring 12 or the LAN is formed or defined at least in part by standard hardware modules, a standard operating system, and/or standard communications specifications.

Via the actuators A1–A6 and the applicable final control elements, for example during, the mass per unit of surface area, the moisture content, the thickness, the smoothness, and/or the gloss of the fibrous web and/or the like may be varied.

Figure 2:
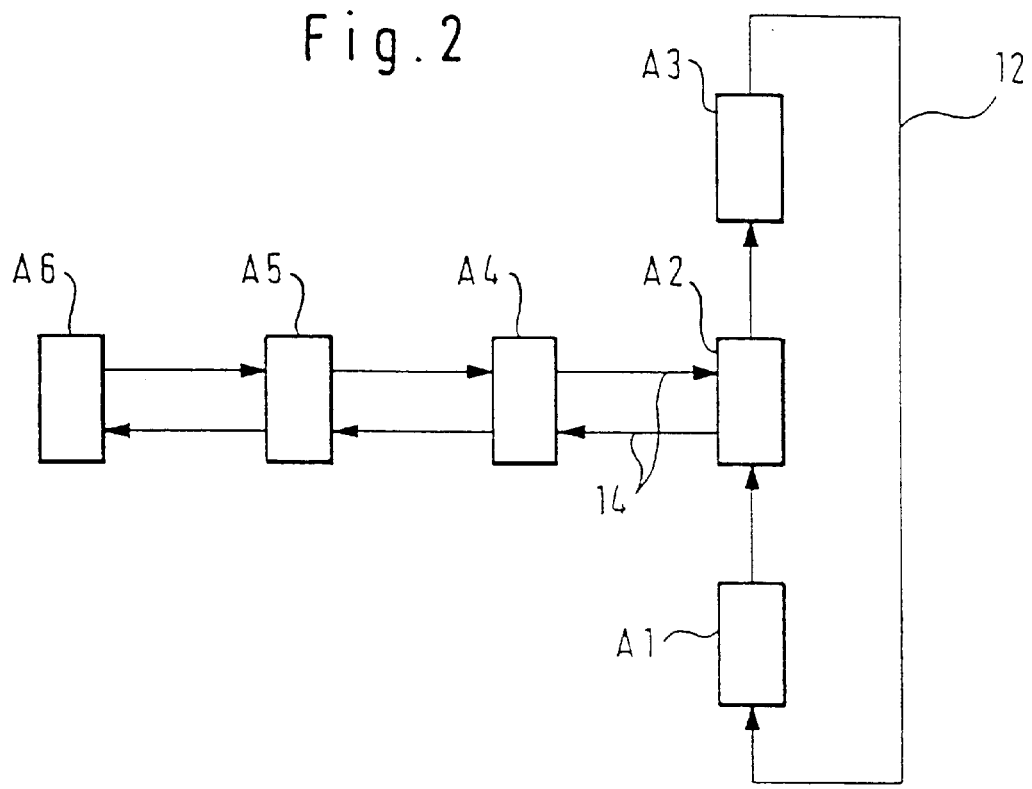
FIG. 2 shows the decentralized communications hardware structure of a further exemplary embodiment of the control and/or regulating system of the invention.

In the exemplary embodiment shown in FIG. 2, the ring structure is in the form of a star structure. In particular, the participant A2 formed for example by an actuator can keep in contact not only with the two adjacent participants A1 and A3 of the closed pipeline ring 12 but in addition with an adjacent participant A4 of a tie line 14. In FIG. 2, two further participants A5 and A6 of this tie line 14 are indicated. Ring communication is also possible in the tie line 14. The participants A1–A6 of the closed pipeline ring 12 or of the tie line 14 may for example, be actuators. In principle, however, once again at least one control unit may be provided as well. In principle, within the combined ring and star structure, each participant can communicate with every other participant.

Figure 3:
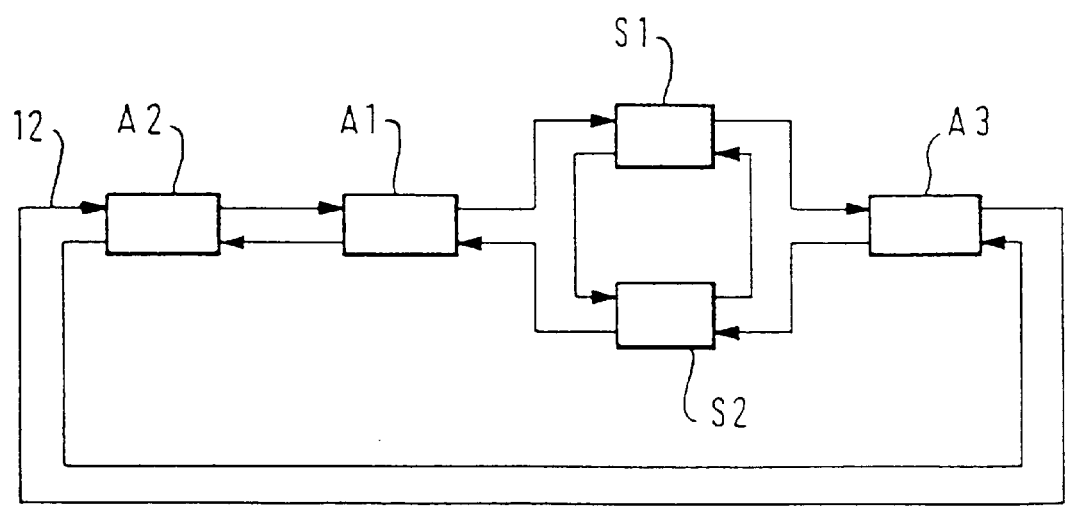
FIG. 3 shows the decentralized communications hardware structure of a further exemplary embodiment.

FIG. 3 shows a redundant structure, in which two control units S1 and S2, disposed parallel to one another, monitor each other. In the exemplary embodiment shown, these control units S1 and S2, like the actuators A1 and A1 also shown, are again participants of a closed pipeline ring 12, which in the present case is bidirectional.

In all the exemplary embodiments described above, the pipeline ring can be replaced with a preferably ethernet-based so-called local area network (LAN). Each receiving participant can then see the sending participant at all times; only one participant at a time is possible, but it can be any arbitrary participant. Each participant filters out the data packets intended for it and optionally responds to it to the sender. One consequence of this concept is that automatic address specification is no longer possible. Instead, this must now be done manually when the system is configured. However, as before, no master is necessary; that is, the system has what is called a peer-to-peer configuration, in which all the participants are of equal rank. The previously indicated redundancy concept is preserved. Accordingly, if one control unit fails, its function can automatically be taken over by another control unit. In principle, the physical connection of the individual participants and their functions can be as in conjunction with the pipeline ring. Both the concept and the pipeline structure are no longer a classical bus system with a master and many slaves, but rather a network system with purely equal-ranking participants. A

What is claimed is:

1. A control system of a machine for making a fibrous web, comprising:
   a plurality of actuators, each assigned to one final control element to vary certain properties of said fibrous web; and
   said actuators forming intelligent participants in a decentralized communications hardware structure, in which said actuators are coupled to one another through at least one of a closed pipeline ring and a local area network.

2. The control system of claim 1, wherein said actuators control at least one of cross direction profile and machine direction profile regulation of certain properties of said fibrous web.

3. The control system of claim 1, further comprising at least one control unit provided in said at least one of said closed pipeline ring and said local area network.

4. The control system of claim 3, wherein said actuators and said at least one control unit are equal-ranking participants in said at least one of said closed pipeline ring and said local area network.

5. The control system of claim 1, wherein said closed pipeline ring is a unidirectional ring.

6. The control system of claim 1, wherein said closed pipeline ring is a bidirectional ring.

7. The control system of claim 1, wherein each data packet transmitted over said closed pipeline ring is provided with an identifier, said each data packet being removed from the ring, at the latest, by the participant which transmitted it.

8. The control system of claim 7, wherein a size of said each data packet transmitted via the closed pipeline ring is variable.

9. The control system of claim 7, wherein said size of said each data packet can be varied by at least one of said participants.

10. The control system of claim 1, wherein addresses assigned to said participants are determined by their respective geometric positions in said closed pipeline ring.

11. The control system of claim 1, wherein an address for each of said participants of the closed pipeline ring is assigned automatically.

12. The control system of claim 11, wherein said address is assigned one of during and after said closed pipeline ring is put into operation.

13. The control system of claim 1, further comprising at least two control units provided as intelligent participants in said one of said closed pipeline ring and said local area network.

14. The control system of claim 13, wherein one control unit of said at least two control units monitors at least one other control unit of said at least two control units.

15. The control system of claim 14, wherein in the event that any of said at least one other control unit malfunctions, said one control unit issues an error report, turns off said at least one other control unit, and assumes the operations of said at least one other control unit.

16. The control system of claim 1, wherein said closed pipeline ring is configured at least one of fiber optics, coaxial cables, and twisted pairs.

17. The control system of claim 1, wherein said actuators include their own processors.

18. The control system of claim 1, wherein said at least one of said closed pipeline aid local area network forms a multiprocessing system.

19. The control system of claim 18, wherein each actuator operates on the basis of at least a portion of a control algorithm.

20. The control system of claim 1, wherein at least one of a cross and machine direction profile regulation of certain properties of said fibrous web is effected solely by parallel-operation of said actuators, said actuators being provided with their own processors, and which coordinate with each other through said at least one of said closed pipeline ring and said local area network.

21. The control system of claim 1, wherein each of said actuators performs at least one of position regulation, a self-test, status ascertainment, and communication with other participants in said at least one of said closed pipeline ring and local area network.

22. The control system of claim 1, wherein said decentralized communications hardware structure is formed at least partially by at least one of standard hardware modules, a standard operating system, and standard communications specifications.

23. The control system of claim 1, wherein said actuators of said final control elements regulate at least one of a mass per unit of surface area, a moisture content, a thickness, a smoothness, and a gloss of the fibrous web.

24. The control system of claim 1, wherein parallel measured values from stationary, parallel-operating sensors can be processed in decentralized fashion.

25. The control system of claim 1, wherein said local network is an ethernet.

26. A control system of a machine for making a fibrous web, comprising:

a plurality of actuators, each assigned to one final control element to vary certain properties of said fibrous web;

each actuator including a processor;

each actuator forming an intelligent participant in a decentralized communications hardware structure; and each actuator being coupled to one another through a local area network, wherein the plurality of actuators are adapted to regulate certain properties of the fibrous web.

27. A control system of a machine for making a fibrous web, comprising:

a plurality of actuators, each assigned to one final control element to vary certain properties of said fibrous web;

each actuator including a processor;

each actuator forming an intelligent participant in a decentralized communications hardware structure; and each actuator being coupled to one another through a closed pipeline ring, wherein the plurality of actuators are adapted to regulate certain properties of the fibrous web.

* * * * *